US009067495B2

(12) United States Patent
Tippery et al.

(10) Patent No.: US 9,067,495 B2
(45) Date of Patent: Jun. 30, 2015

(54) SYSTEM AND METHOD FOR OPERATING VEHICLE DRIVE WHEELS

(71) Applicant: AGCO Corporation, Duluth, GA (US)

(72) Inventors: Steven R. Tippery, Newton, KS (US); Emmanuel R. Magisson, Newton, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 13/832,282

(22) Filed: Mar. 15, 2013

(65) Prior Publication Data

US 2014/0262585 A1 Sep. 18, 2014

(51) Int. Cl.
*B60K 26/02* (2006.01)
*B60K 23/08* (2006.01)
*B60W 10/103* (2012.01)
*B60W 30/18* (2012.01)

(52) U.S. Cl.
CPC ......... *B60K 23/08* (2013.01); *B60K 2023/0816* (2013.01); *B60W 10/103* (2013.01); *B60W 30/18172* (2013.01); *B60Y 2200/222* (2013.01)

(58) Field of Classification Search
CPC .......... B60K 23/08; B60K 2023/0816; B60W 10/103; B60W 30/18172; B60Y 2200/222
USPC ........................ 180/197, 242, 305; 701/41, 42
See application file for complete search history.

(56) References Cited

U.S. PATENT DOCUMENTS

| 4,796,957 | A | * | 1/1989 | Wakata et al. ............. 303/116.2 |
| 5,899,292 | A | * | 5/1999 | Paul et al. ..................... 180/419 |
| 6,135,231 | A |   | 10/2000 | Reed |
| 6,422,333 | B1 |  | 7/2002 | Kjaer et al. |
| 6,904,993 | B1 |  | 6/2005 | Rinck et al. |
| 7,121,374 | B1 |  | 10/2006 | Ho et al. |
| 7,357,214 | B2 |  | 4/2008 | Ho et al. |
| 2010/0018727 | A1 | * | 1/2010 | Carlton et al. .................... 172/1 |

* cited by examiner

*Primary Examiner* — Joseph Rocca
*Assistant Examiner* — Jacob Knutson

(57) ABSTRACT

An agricultural machine, such as a combine harvester, includes a chassis supported by a pair of front wheels and a pair of steerable rear wheels, a first drive mechanism for driving at least one of the front wheels to move the chassis at a designated forward speed, and a second drive mechanism configured to operate independently of the first drive mechanism and to drive at least one of the rear wheels. A controller is configured to actuate the second drive mechanism in response to a user command to drive the at least one rear wheel to apply forward pressure on the chassis regardless of the forward speed. The controller may actuate the second drive mechanism to apply a maximum forward torque to the at least one rear wheel to thereby apply the forward pressure to the chassis.

8 Claims, 3 Drawing Sheets

SYSTEM AND METHOD FOR OPERATING VEHICLE DRIVE WHEELS

FIELD

Embodiments of the present invention relate to systems and methods for controlling vehicle drive wheels.

BACKGROUND

A combine harvester (also referred to herein as a "combine") is a self-propelled machine that harvests grain crops by performing reaping, threshing and winnowing operations in a single process. Combines may be used, for example, to harvest wheat, oats, rye, barley, corn (maize), soybeans, canola and flax (linseed).

Combines are equipped with removable cutting heads, also known as headers or grain platforms, that are designed for use with particular crops. Cutting heads are positioned at the front of the combine and, as the combine travels through a field during a harvesting operation, operate to cut grain stalks and feed the stalks to the combine's threshing system housed within the body of the combine. The grain stalks are then threshed to separate the grain from the chaff, and the grain is collected in a grain holding bin while the chaff is discharged from the combine.

Combines are manufactured in various sizes and configurations to meet the needs of particular geographic locations and operating conditions. Modern combines can be very large and weigh many tons. The cutting head alone, for example, can weigh several tons and be over forty feet wide. Combines typically include large front wheels that bear the weight of the cutting head and provide forward and reverse propulsion. Large combines may include multiple large front wheels on each side of the combine. The combine's rear wheels are typically smaller in size than the front wheels and are used to steer the combine.

The above section provides background information related to the present disclosure which is not necessarily prior art.

SUMMARY

An agricultural machine constructed in accordance with an embodiment of the present invention comprises a chassis supported by a pair of front wheels and a pair of steerable rear wheels, a first drive mechanism for driving at least one of the front wheels to move the chassis at a designated forward speed, and a second drive mechanism configured to operate independently of the first drive mechanism and to drive at least one of the rear wheels. A controller actuates the second drive mechanism in response to a user command to drive the at least one rear wheel to apply forward pressure on the chassis regardless of the forward speed.

An agricultural machine constructed in accordance with another embodiment of the invention comprises a chassis supported by a pair of front wheels and a pair of steerable rear wheels and a first hydraulic motor for driving at least one of the front wheels to move the chassis at a designated forward speed. A second hydraulic motor is configured to operate independently of the first hydraulic motor and drives a first of the pair of rear wheels, and a third hydraulic motor is configured to operate independently of the first and second hydraulic motors to drive a second of the pair of rear wheels.

The machine further includes a user interface and a controller configured to receive a command from the user interface and, in response to receiving the command, actuate the second and third hydraulic motors to drive the first and second rear wheels to apply forward pressure on the chassis regardless of the forward speed.

A method of operating the drive wheels of an agricultural machine in accordance with yet another embodiment of the invention comprises receiving a forward speed indicator from a user interface and actuating a first drive mechanism to drive at least one front wheel to move a chassis of the machine at the forward speed. A first command is received from the user interface and, in response to the first command, a second drive mechanism is actuated to drive at least one steerable rear wheel independently of the at least one front wheel to apply forward pressure on the chassis regardless of the forward speed. A second command is received from the user interface and in response to the second command, the second drive mechanism is actuated to stop driving the at least one rear wheel an that the at least one rear wheel spins freely.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
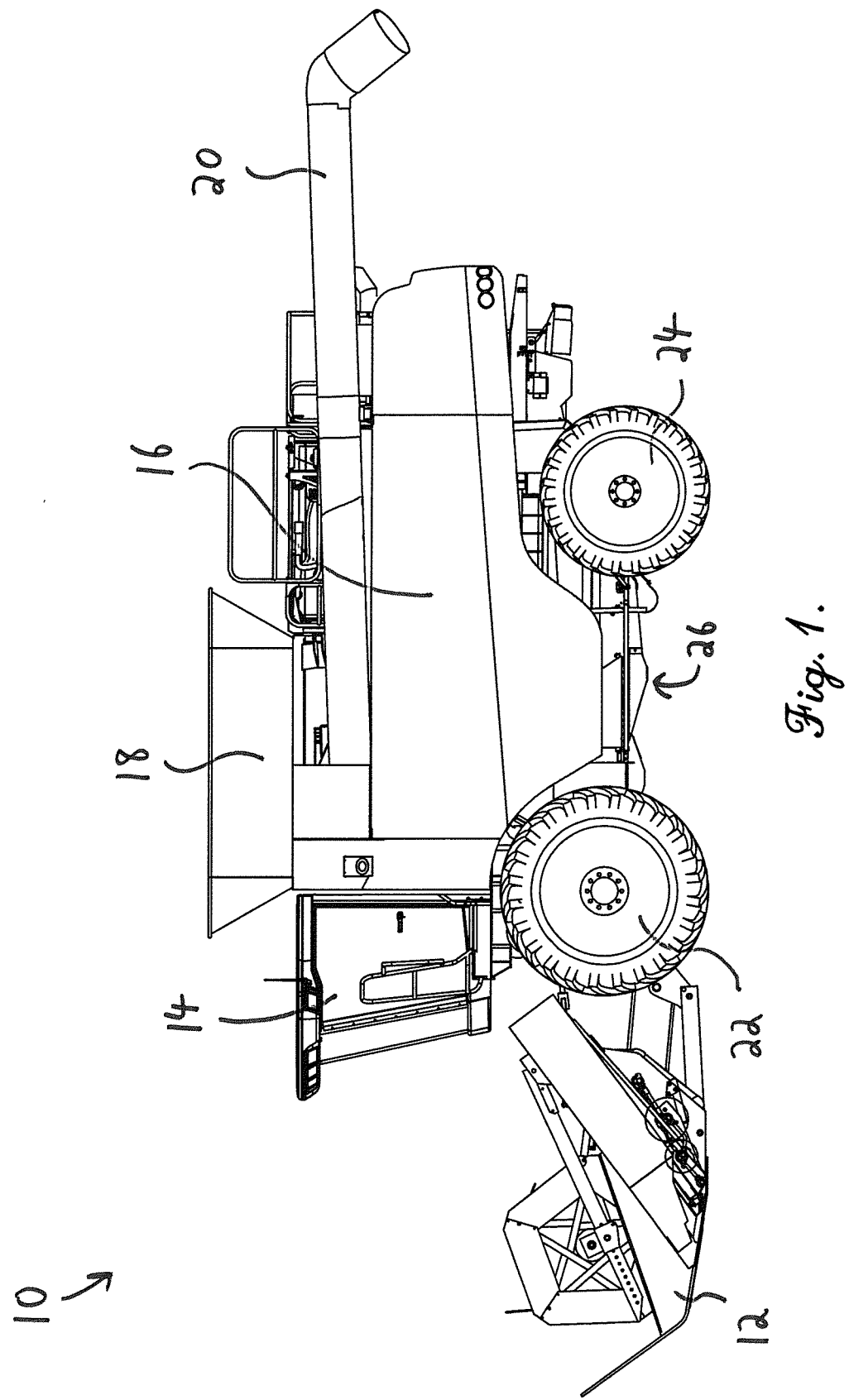
FIG. 1 is a side elevation view of a combine harvester embodying principals of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc.

described in one embodiment may also be included in other embodiments, but is not necessarily included. Thus, the present technology can include a variety of combinations and/or integrations of the embodiments described herein.

Embodiments of the present invention relate to systems and methods for operating vehicle drive wheels such that one or more first wheels provide primary propulsion and one or more second wheels selectively provide on-demand supplemental propulsion. In some embodiments, the vehicle's front wheels provide primary propulsion while the vehicle's rear wheels provide supplemental propulsion, wherein the supplemental propulsion exceeds the primary propulsion so that the rear wheels apply forward pressure on or "push" the vehicle. Such supplemental propulsion may be useful, for example, in adverse operating conditions or when the vehicle is towing another vehicle or piece of equipment. Principles of the present invention may be implemented, for example, in agricultural machines such as combine harvesters, windrowers, and the like.

In some embodiments, the system is implemented in a combine harvester ("combine") such as the combine 10 illustrated in FIG. 1. The combine 10 may be mostly conventional in nature and may include, among other things, a cutting head 12, an operator cabin 14, a threshing system housed within a body 16 of the combine, a grain holding bin 18 and a grain unloading conveyor 20. A plurality of front wheels 22 and a plurality of rear wheels 24 support a chassis 26 and provide mobility to the combine 10. As explained below, the front wheels 22 drive the combine 10 at a designated travel speed and the rear wheels 24 may be activated, upon demand, to provide supplemental propulsion.

Figure 2:
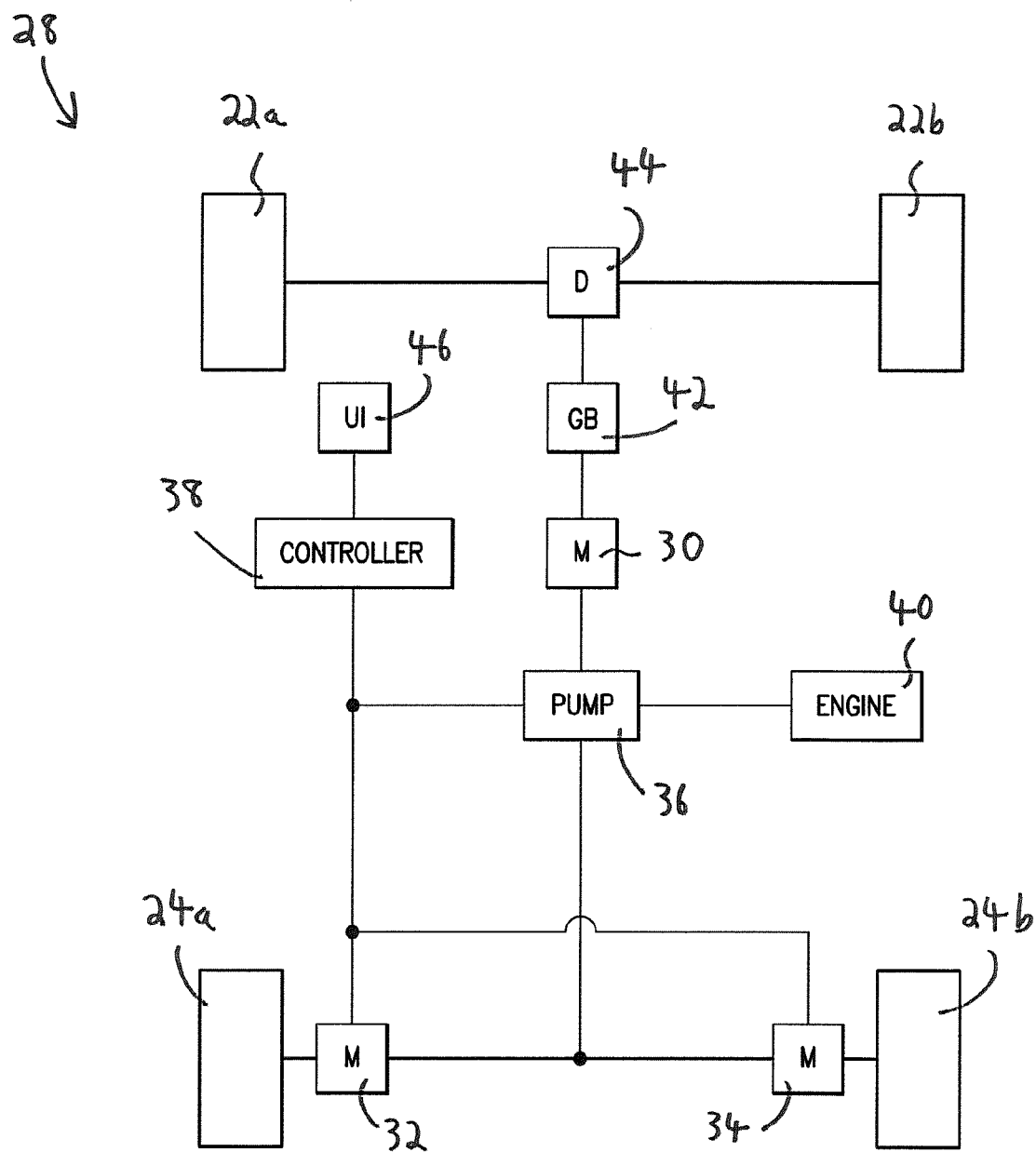
FIG. 2 is a schematic diagram of a vehicle drive system constructed in accordance with a first embodiment of the invention.

A schematic diagram of certain components of a vehicle drive system 28 for use with the combine 10 and constructed in accordance with a first embodiment of the invention is illustrated in FIG. 2. The drive system 28 broadly includes a first hydraulic motor 30 for driving a plurality of front wheels 22, a second hydraulic motor 32 for driving a first rear wheel 24a, a third hydraulic motor 34 for driving a second rear wheel 24b, a hydraulic pump 36 for providing hydraulic power to the hydraulic motors 30, 32, 34, a controller 38 for directing operation of the pump 36 and one or more of the motors 30, 32, 34, and an internal combustion engine 40 for powering the hydraulic pump 36 and other combine functions.

As used herein, the term "wheel" includes wheel and tire combinations and may have reference to a single wheel or multiple wheels operating jointly, such as dual wheels. Furthermore, some combines include track assemblies in lieu of the front wheels. Unless otherwise noted, references to "front wheel" and "front wheels" herein shall include wheels, as defined in this paragraph, as well as track assemblies or other propulsion means. Other systems and components of the combine 10, such as a hydraulic fluid reservoir and an electrical power system driven by the engine for providing electrical power to the controller 38 and other components, may be conventional in nature and are omitted from the present discussion for the purpose of simplicity.

The first hydraulic motor 30 may be a static displacement hydraulic motor that drives the front wheels 22 via a gear box 42 and a differential 44. The gearbox 42 may have four operating gears including three lower gears used primarily for off-road operations, such as harvesting, and a higher road gear. Operation of the gear box 42 may be controlled directly or indirectly by a user in a conventional manner to set the travel speed of the combine 10.

The second hydraulic motor 32 drives a first rear wheel 24a and may be coupled directly with the first rear wheel 24a. Similarly, the third hydraulic motor 34 drives the second rear wheel 24b and may be coupled directly with the second rear wheel 24b. The second motor 32 and the third motor 34 operate independently of one another and of the first hydraulic motor 30 such that the rear wheels 22a, 24b may be driven independently of one another and of the front wheels 22a, 22b, as explained below in greater detail. The second and third hydraulic motors 32, 34 may be variable displacement hydraulic motors that generate selectively variable torque according to displacement, such that the controller 38 determines an amount of torque generated by each of the motors 32, 34 by adjusting the displacement.

Each of the motors 30, 32, 34 may have a maximum displacement of between 50 and 300 cubic centimeters per revolution, a flow of between 200 and 800 liters per minute at the maximum displacement, and capable of producing between 400 and 3,000 newton-meters of torque. By way of example, the motors 30, 32, 34 may be selected from the A6VM family of motors manufactured by BOSCH REXROTH or from the family of motors manufactured by SAUER DANFOSS.

The hydraulic pump 36 is operably connected to each of the hydraulic motors 30, 32, 34 and drives the motors 30, 32, 34 at various speeds as directed by the controller 38. Increasing pump production generally increases the drive speed of each of the motors 30, 32, 34, while decreasing pump production generally decreases the drive speed of each of the motors 30, 32, 34. The engine 40 may be a standard internal combustion engine with, for example, between five and ten liters of displacement and be capable of generating between 250 and 500 horsepower.

The controller 38 is operable to direct operation of the second and third motors 32, 34 and the pump 36 as explained herein. It will be appreciated that the controller 38 may be part of a larger control system and/or may be operable to direct operation of various aspects of the combine 10 beyond those discussed herein. The controller 38 preferably includes one or more digital integrated circuits and may include a general use, commercial off-the-shelf computer processor, a programmable logic device configured for operation with the combine 10, and/or an application specific integrated circuit (ASIC) especially manufactured for use in the combine 10. While illustrated as a single component, the controller 38 may include two or more separate integrated circuits working in cooperation, and may include one or more analog circuits operating in concert with or in addition to the digital circuit or circuits. The controller 38 may include or be in communication with a memory element operable to store data, instructions, or both for use by the controller.

A user interface 46 enables a user to interact with the controller 38 to view information generated by the controller 38 and to manipulate various functions enabled by the controller 38, including the supplemental rear wheel propulsion discussed herein. The user interface 46 may include one or more touchscreens or other displays, a keypad, buttons, switches, levers or similar components to enable the user to submit information and commands to the controller 38 and to present information to the user.

The controller 38 is configured to selectively actuate the second and third hydraulic motors 32, 34 to drive the rear wheels 24a, 24b to provide supplemental propulsion for the combine 10, wherein the rear wheels 24 apply forward pressure on the chassis 26 and "push" the combine 10. The supplemental propulsion function may be selectively activated and deactivated by a user, such as via the user interface 46. Supplemental propulsion may be desirable, for example, in adverse operating conditions such as soft and/or wet ground, wherein the supplemental propulsion improves the steering ability of the rear wheels 24 and reduces or eliminates front wheel slippage, which may cause the combine 10 to get stuck and/or leave excessively large ruts. Supplemental propulsion may also be desirable when the combine 10 is used to tow another vehicle or piece of equipment off-road, wherein the propulsion contributed by the rear wheels 24 not only reduces or eliminates front wheel slippage in adverse conditions, but also isolates the weight of the pulled load to the combine's rear wheels 24 or axle such that the weight of the load is not transferred to the chassis 26 or the front wheels 22 or front axle.

The controller 38 is also configured to selectively actuate the second and third hydraulic motors 32, 34 to cease providing the supplemental propulsion, wherein the motors 32, 34 do not drive or impede movement of the rear wheels 24a, 24b and the rear wheels spin freely and simply follow movement of the combine 10. In this state of operation, the motors 32, 34 may be completely disengaged from the wheels 24a, 24b, or may be engaged with the wheels 24a, 24b but hydraulically disengaged from the pump 36.

To initiate the rear wheel propulsion, the controller 38 actuates each of the second and third motors 32, 34 to apply forward torque on its respective wheel 24a, 24b to thereby apply a forward pressure on the chassis 26 and "push" the combine 10. In some implementations, the controller 38 actuates the first and second motors 32, 34 to apply a maximum forward torque available from the motors. The second and third motors 32, 34 continue to apply an uninterrupted forward pressure on the chassis 26 as the forward travel speed of the combine 10 changes, such as when the production of the pump 36 increases or decreases, when the operator shifts gears, or when the terrain or conditions in which the combine 10 is operating changes.

When the controller 38 drives the second and third motors 32, 34 to apply forward pressure on the chassis 26 during normal operation, the rear wheels 24 will typically rotate at a rate corresponding to the travel speed of the chassis 26 without slipping, even if the motors 32, 34 are applying a maximum torque. Friction between the wheels 24 and the ground will generally prevent the wheels 24 from slipping. In certain operating conditions, however, friction between the wheels 24 and the ground may be compromised such that the wheels 24 to slip relative to the ground, wherein the controller 38 may respond by reducing the slipping or maintain a certain amount of slip, as explained below. The controller 38 may detect slip by monitoring, for example, the rate of rotation of the wheels 24a, 24b relative to the travel speed of the chassis 26 or relative to the rate of rotation of the front wheels 22a, 22b.

As used herein, "travel speed" refers to the rate or speed at which the chassis 26, wheels 22, 24 or other components move relative to the ground and, when discussed in the context of a wheel, has reference to translational movement and not rotation movement. A wheel rotates at a rate corresponding to a particular travel speed when the wheel rolls along the ground at the travel speed such that the portion of the wheel engaging the ground does not move or "slip" forward or backward relative to the ground. If the wheel rotates at a rate greater than the travel speed the wheel experiences positive slip, and if the wheel rotates at a rate less than the travel speed the wheel experiences negative slip. The rotational rate corresponding to a particular travel speed depends on wheel size.

In some conditions, such as conditions including a soft or muddy ground surface, one or both of the rear wheels 24a, 24b may slip when driven by the motors 32, 34, as explained above. The controller 38 may detect when either of the rear wheels 24a, 24b slips and respond by taking actions to eliminate or limit wheel slip. More particularly, the controller 38 may determine when either of the rear wheels 24a, 24b experiences a predetermined amount of slip and respond by actuating one or both of the motors 32, 34 to reduce output torque to thereby reduce or eliminate slipping. The predetermined amount of slip may be any detectible amount of slip regardless of magnitude, or may be a percentage of the rate of rotation corresponding to the travel speed of the wheels 24, such as at least one percent, two percent, three percent, four percent or five percent.

When responding to rear wheel slip, the controller 38 may actuate one or both of the motors 32, 34 to decrease output torque until slip is reduced to zero, or may actuate the motors 32, 34 to operate at a predetermined, constant slip. If the combine 10 is operating in a muddy field, for example, it may be desirable to maintain a certain level of positive slip to maximize the forward pressure applied to the chassis 26 by the rear wheels 24. To implement a constant forward slip, the controller 38 may monitor the wheel slip and increase or decrease torque applied to the wheels 24 to increase or decrease the slip. The constant forward slip may be set to a percentage of the rotational rate corresponding to the travel speed of the combine 10, such as between one percent and ten percent, and may particularly be about one percent, about two percent, about three percent, about four percent or about five percent of the rotational rate.

Similarly, the controller 38 may be configured to actuate the second and third motors 32, 34 to drive the rear wheels 24 to rotate at a target rate corresponding to a higher travel speed than the front wheels 22. In this embodiment, the rear wheels 24 would rotate at a rate corresponding to a travel speed higher than the actual travel speed and thus would experience some positive slip during normal operation of rear wheel propulsion.

The controller 38 may be configured to operate each of the second and third hydraulic motors 32, 34 independently of the other. Thus, if the first rear wheel 24a experiences slip but the second rear wheel 24b does not, the controller 38 may actuate the second hydraulic motor 32 to decrease torque on the first rear wheel 24a to reduce or eliminate the slip without adjusting operation of the second rear wheel 24b.

When the second and third motors 32, 34 are actuated to provide supplemental propulsion, they may apply a constant and/or uninterrupted forward pressure on the chassis 26 regardless of the travel speed of the combine 10. If the second and third motors 32, 34 apply a maximum torque on the rear wheels, for example, they may apply the maximum torque uninterrupted as the travel speed of the combine 10 increases and decreases, such as when the combine 10 slows down to make a turn.

In operation, the front wheels 22a, 22b may initially drive the combine 10 at a designated forward speed. The forward speed may be designated by a user or by a machine/computer, such as the controller 38, and may be set by selecting a drive gear via the gear box 42, actuating the pump 36 to drive the first motor 30 at a particular speed, or both. The combine 10 may be operated using only front wheel propulsion until the operator determines that rear wheel supplemental propulsion is necessary, wherein the operator activates the rear wheel propulsion via the user interface 46. Alternatively, the operator may choose to activate the rear wheel propulsion at the start of operations. In either scenario, the controller 38 actuates the second and third motors 32, 34 to drive the rear wheels 24a, 24b to apply forward pressure on the chassis 26, as explained above.

The rear wheel propulsion may continue uninterrupted, even if the forward speed of the combine 10 increases or decreases, until deactivated by the operator. When the operator determines that rear wheel supplemental propulsion is no longer necessary he or she deactivates the rear wheel propulsion via the user interface 46. The controller 38 then directs the second and third motors 32, 34 to cease driving the rear wheels 24a, 24b to allow the wheels 24a, 24b to spin freely, as explained above, wherein the wheels 24a, 24b simply follow movement of the combine 10. In this manner, the operator may activate and deactivate the rear wheel propulsion multiple times during a single operation.

Figure 3:
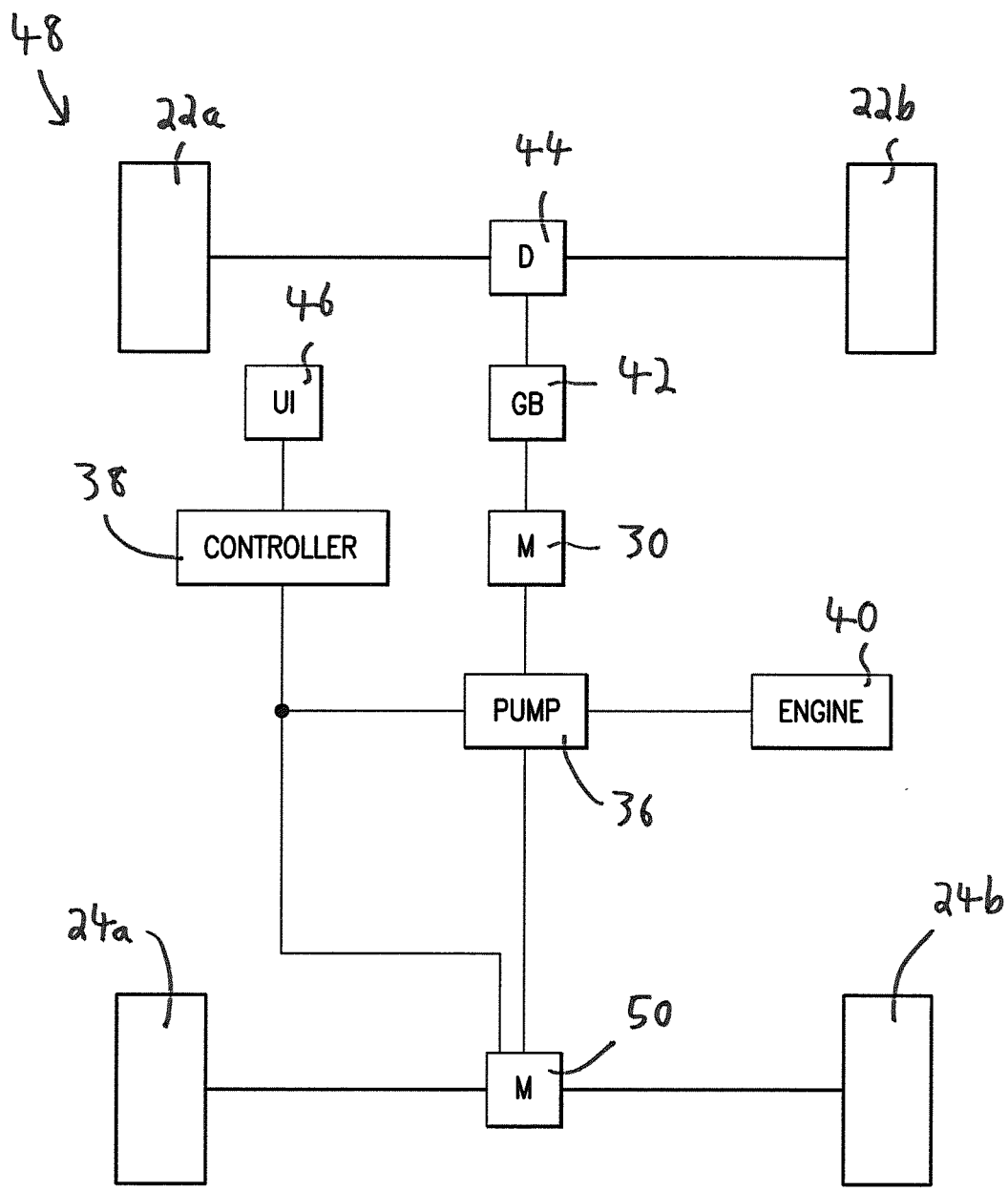
FIG. 3 is a schematic diagram of a vehicle drive system constructed in accordance with a second embodiment of the invention.

A schematic diagram of certain components of a second vehicle drive system 48 for use with the combine 10 and constructed in accordance with a second embodiment of the invention is illustrated in FIG. 3. The drive system 48 may be identical to the first drive system 28, described above, except that the drive system 48 includes a single hydraulic motor 50 to drive both of the rear wheels 24. In this embodiment, the motor 50 drives both wheels 24a, 24b simultaneously but otherwise functions as the second and third motors 32, 34 described above. The system 48 may include other drive components, such as a differential, associated with the motor 50 but are omitted from FIG. 3 for the purpose of simplicity.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An agricultural machine comprising:
   a chassis supported by a pair of front wheels and a pair of steerable rear wheels;
   a first hydraulic motor for driving at least one of the front wheels to move the chassis at a designated forward speed;
   a second hydraulic motor configured to operate independently of the first hydraulic motor and to drive a first of the pair of rear wheels;
   a third hydraulic motor configured to operate independently of the first and second hydraulic motors and to drive a second of the pair of rear wheels;
   a user interface; and
   a controller for controlling operation of the second and third hydraulic motors to provide rear wheel supplemental propulsion, the controller configured to receive a rear wheel supplemental propulsion command from the user interface and, in response to receiving the rear wheel supplemental propulsion command, actuate the second and third hydraulic motors to drive the first and second rear wheels to apply forward pressure on the chassis regardless of the forward speed, the controller further configured to actuate the second and third hydraulic motors to maintain the first and second rear wheels turning at a rate corresponding to a higher travel speed than the at least one front wheel and the actual travel speed of the vehicle to thereby apply the forward pressure on the chassis while causing both the first and second rear wheels to continuously slip while operating with rear wheel supplemental propulsion.

2. The agricultural machine as set forth in claim 1, the controller configured to actuate the second and third hydraulic motors to apply maximum torque available from the motors to the first and second rear wheels to thereby apply the forward pressure on the chassis.

3. The agricultural machine as set forth in claim 2, the controller further configured to:
   automatically actuate the second hydraulic motor to decrease the torque applied to the first rear wheel when the first rear wheel experiences a predetermined amount of slip, and
   automatically actuate the third hydraulic motor to decrease the torque applied to the second rear wheel when the second rear wheel experiences a predetermined amount of slip.

4. The agricultural machine as set forth in claim 1, further comprising a single hydraulic pump driving each of the first, second and third hydraulic motors.

5. The agricultural machine of claim 1, the controller further configured to:
   direct the second hydraulic motor, in response to a user command, to stop driving the first rear wheel such that the first rear wheel spins freely, and
   direct the third hydraulic motor, in response to a user command, to stop driving the second rear wheel such that the second rear wheel spins freely.

6. The agricultural machine of claim 1, the first hydraulic motor configured to drive the at least one front wheel to move the chassis at any of a plurality of forward speeds, with said designated forward speed being one of the plurality of forward speeds, and to transition between a first forward speed and a second forward speed, and
   the controller configured to actuate the second hydraulic motor and the third hydraulic motor in response to the user command to drive the first and second rear wheels to apply a constant, uninterrupted forward pressure on the chassis as the first hydraulic motor transitions between the first forward speed and the second forward speed.

7. The agricultural machine of claim 1, wherein the controller actuates the second and third hydraulic motors to drive the first and second rear wheels to turn at a higher travel speed than the at least one front wheel in response to input from the user interface to operate the agricultural machine in a towing mode.

8. The agricultural machine of claim 1, wherein the controller actuates the second and third hydraulic motors to drive the first and second rear wheels to turn at a higher travel speed than the at least one front wheel in response to input from the user interface to operate the agricultural machine in a soft and/or wet ground mode.

* * * * *